United States Patent
Yan et al.

(10) Patent No.: US 9,101,015 B2
(45) Date of Patent: Aug. 4, 2015

(54) ADAPTIVE BIPOLAR JUNCTION TRANSISTOR GAIN DETECTION

(75) Inventors: Liang Yan, Milpitas, CA (US); Clarita C. Poon, Pleasanton, CA (US); Hien Huu Bui, San Jose, CA (US); Chuanyang Wang, Cupertino, CA (US); Andrew Kwok-Cheung Lee, Union City, CA (US); John William Kesterson, Seaside, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 42 days.

(21) Appl. No.: 13/419,329

(22) Filed: Mar. 13, 2012

(65) Prior Publication Data

US 2013/0242625 A1 Sep. 19, 2013

(51) Int. Cl.
| | | |
|---|---|---|
| *H02M 1/36* | (2007.01) | |
| *H05B 33/08* | (2006.01) | |
| *H05B 41/292* | (2006.01) | |
| *H05B 41/392* | (2006.01) | |

(52) U.S. Cl.
CPC ........ *H05B 33/0815* (2013.01); *H05B 33/0848* (2013.01); *H05B 41/2928* (2013.01); *H02M 1/36* (2013.01); *H05B 41/3925* (2013.01); *Y02B 20/347* (2013.01)

(58) Field of Classification Search
USPC ......... 323/282, 277, 278, 312, 222, 212, 217, 323/237, 284, 905, 283, 285, 286, 290; 315/224, 246, 291, 307
See application file for complete search history.

(56) References Cited

U.S. PATENT DOCUMENTS

| | | | | |
|---|---|---|---|---|
| 4,327,693 | A * | 5/1982 | Brusser ......................... | 123/490 |
| 5,341,032 | A * | 8/1994 | Brambilla et al. ............ | 327/110 |
| 5,612,610 | A * | 3/1997 | Borghi et al. ................. | 323/222 |
| 6,040,686 | A * | 3/2000 | Schenkel ...................... | 323/282 |
| 2011/0025234 | A1* | 2/2011 | Ohtaka et al. ................. | 315/307 |
| 2011/0241557 | A1* | 10/2011 | Grotkowski et al. ......... | 315/246 |

OTHER PUBLICATIONS

Korean Intellectual Property Office, Office Action, Korean Patent Application No. 10-2013-0020061, Dec. 30, 2013, nine pages.
Linghua, D., "Brief Introduction of Heterojunction Bipolar Transistor," *Semiconductor Information,* Jun. 1984, pp. 37-44, China Academic Journal Electronic Publishing House.
State Intellectual Property Office of the People's Republic of China, First Office Action, Chinese Patent Application No. 201310087105. 0, Sep. 24, 2014, twenty-two pages.
State Intellectual Property Office of the People's Republic of China, Second Office Action, Chinese Patent Application No. 201310087105.0, Mar. 10, 2015, six pages.

* cited by examiner

*Primary Examiner* — Jessica Han
*Assistant Examiner* — Trinh Dang
(74) *Attorney, Agent, or Firm* — Fenwick & West LLP (57) ABSTRACT

A power converter that controls a collector current of a bipolar junction transistor (BJT) by controlling the base current to the BJT after having determined the gain of the BJT. A gain detection block determines a gain of the BJT during a first mode. A current calculation block generates a current setting for the base current based on the gain of the BJT determined by the gain detection block during a second mode distinct from the first mode. In some embodiments, the power converter may be included in a LED lamp system.

22 Claims, 6 Drawing Sheets

ADAPTIVE BIPOLAR JUNCTION TRANSISTOR GAIN DETECTION

BACKGROUND

1. Field of Technology

Embodiments disclosed herein relate generally to a switching power converter and more specifically to adaptively detecting the gain of a bipolar junction transistor of the switching power converter.

2. Description of the Related Arts

Switching power converters include a power stage for delivering electrical power from a power source to a load and a switching device in the power stage. Bipolar junction transistors (BJTs) are commonly used semi-conductor switching devices in power electronic systems including switching-mode power supplies due to their low cost. Switching power converters using BJTs are used to deliver electrical power to electronic applications that use light emitting diodes (LEDs) such as architectural lighting, automotive head and tail lights, backlights for liquid crystal display devices, flashlights, etc. Compared to conventional lighting sources such as incandescent lamps and fluorescent lamps, LEDs have significant advantages, including high efficiency, good directionality, color stability, high reliability, long life time, small size, and environmental safety.

Some LED lamps (i.e. LED lightbulbs) may include a switching power converter to convert an AC input power to a DC power for driving the LEDs of the LED lamps. The LED lamps can be plugged into a lightbulb socket and dimmed by varying the average AC input power to the LED lamps with a dimmer switch. Most conventional dimmer switches are designed to work with conventional filament based lightbulbs and not LED lamps. Thus, it has become a challenge to design a LED lamp that can be dimmed with a conventional dimmer switch.

SUMMARY OF THE INVENTION

The embodiments disclosed herein describe a power converter that controls the collector current of a BJT by controlling the base current to the BJT after having determined the gain of the BJT. In one embodiment, the power converter operates in different modes. During a first mode (e.g. a detection mode), the gain of the BJT is adaptively detected. During a second mode (e.g. a linear open loop mode), the detected gain is used to generate a base current for driving the BJT. By detecting the gain of the BJT and then using the gain to generate the base current, any variations in the gain of the BJT can be compensated for to set the current flowing through the transistor to a predictable target level. In some embodiments, the power converter may be included in a LED lamp system.

In one embodiment, a power converter includes a magnetic component coupled to an input voltage and to an output of the switching power converter. A bipolar junction transistor (BJT) is coupled to the magnetic component. A gain detection block is configured to, during a first mode, generate a first current setting signal for setting a base current of the BJT to a first base current level. The gain detection block also determines a gain of the BJT based on a feedback signal indicative of a level of current flowing through the BJT and the first base current level. A current calculation block is configured to, during a second mode distinct in time from the first mode, generate a second current setting signal for setting the base current of the BJT to a second base current level that operates the BJT in a forward-active region. The current calculation block determines the second base current level responsive to a target current level and the determined gain of the BJT.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments disclosed herein can be readily understood by considering the following detailed description in conjunction with the accompanying drawings.

DETAILED DESCRIPTION OF EMBODIMENTS

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein.

Reference will now be made in detail to several embodiments, examples of which are illustrated in the accompanying figures. It is noted that wherever practicable similar or like reference numbers may be used in the figures and may indicate similar or like functionality. The figures depict various embodiments for purposes of illustration only. One skilled in the art will readily recognize from the following description that alternative embodiments of the structures and methods illustrated herein may be employed without departing from the principles described herein.

Embodiments disclosed herein describe a power controller for controlling the base current of a BJT. In one embodiment, the power controller operates in different modes. During a first mode (e.g. a detection mode), the gain of the BJT is adaptively detected. During a second mode (e.g. an open loop mode), the detected gain is used to generate a base current for driving the BJT. By detecting the gain of the BJT and then using the gain to generate the base current, any variations in the gain of the BJT can be compensated for to set the current flowing through the transistor (e.g., collector or emitter current) to a predictable target level. In some embodiments, the power controller may be included in an LED lamp system.

Figure 1:
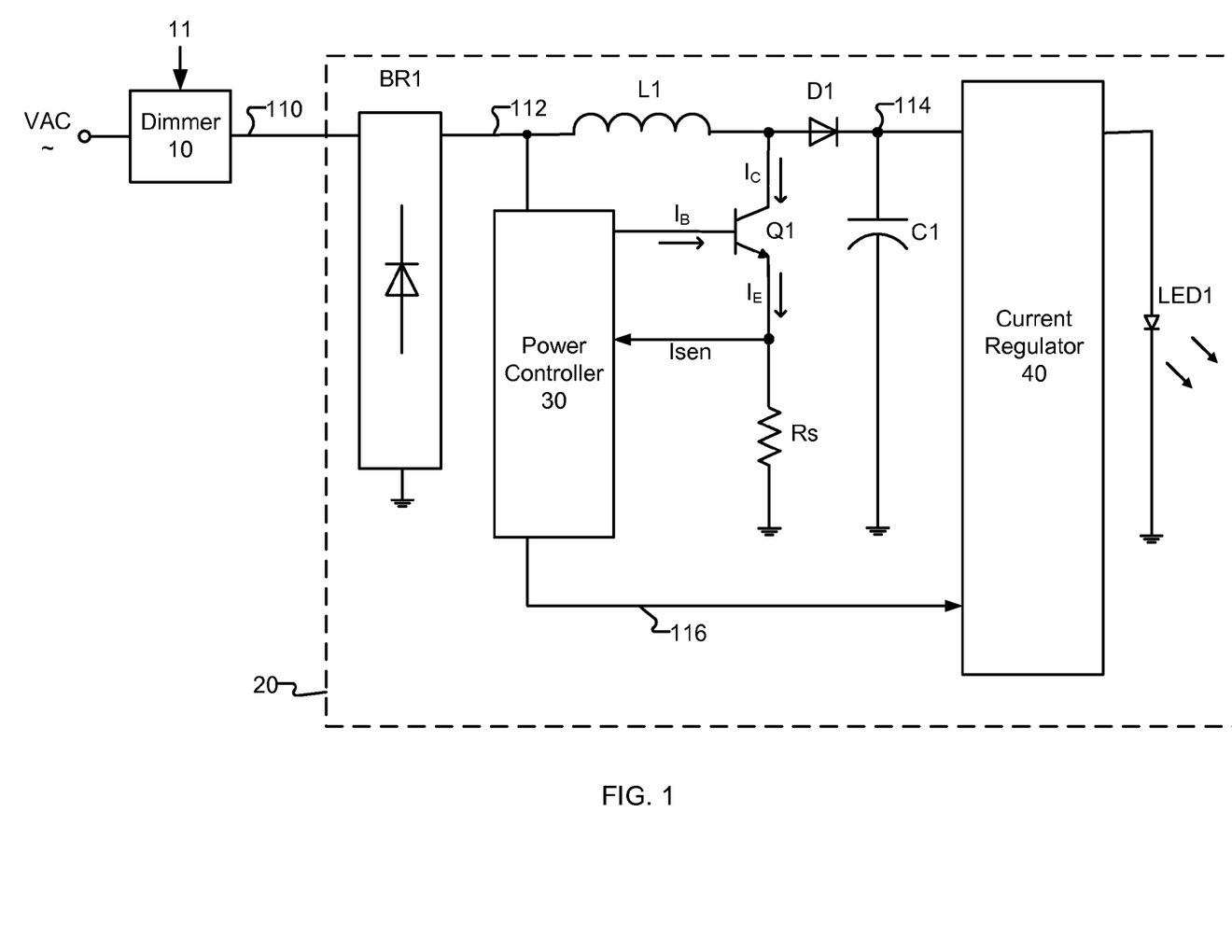
FIG. 1 illustrates a LED lamp system according to one embodiment.

FIG. 1 illustrates an LED lamp system including a dimmer switch 10 and a LED lamp 20. In one embodiment, dimmer switch 10 is a conventional dimmer switch and receives a dimming input signal 11, which is used to set the target light output intensity of LED lamp 20. Dimmer switch 101 receives an AC input voltage signal VAC and adjusts the V-RMS value of the lamp input voltage 110 in response to dimming input signal 11. In other words, control of light intensity of LED lamp 20 by the dimmer switch 101 is achieved by adjusting the V-RMS value of the lamp input voltage 110 that is applied to LED lamp 20. Dimming input signal 11 can either be provided manually (via a knob or slider switch, not shown herein) or via an automated lighting control system (not shown herein).

One example of a dimmer switch is described in U.S. Pat. No. 7,936,132 which is incorporated by reference in its entirety. In one embodiment, dimmer switch 10 employs phase angle switching to adjust the lamp input voltage 110 by using a triode for alternating current (TRIAC) circuit. A TRIAC is a bidirectional device that can conduct current in either direction when it is triggered, or turned on. Once triggered, the TRIAC continues to conduct until the current drops below a certain threshold, called a holding current. For the internal timing of a TRIAC dimmer to function properly, current must be drawn from the dimmer 10 at certain times. Specifically, a TRIAC dimmer has a phase detector circuit that is in parallel with the TRIAC switch itself. Current must flow through the dimmer to a load during the TRIAC off state in order for this phase detector to develop the voltage necessary to trigger a diode for alternating current (DIAC) which indicates the phase value by turning on the TRIAC at that moment. In one embodiment, the LED lamp 20 is configured to draw current from the dimmer 10 during the TRIAC off state in a manner that allows the internal circuitry of the dimmer 10 to function properly.

The LED lamp 20 includes a bridge rectifier BR1, magnetic component L1 (e.g. an inductor), a diode D1, a capacitor C1, a drive transistor Q1, a sense resistor Rs, a power controller 30, a current regulator 40, and a light emitting diode LED 1. Generally speaking, the LED lamp 20 employs a boost type switching AC-DC power converter using a drive transistor Q1 as the switching device driven by a dynamic switch drive signal. Drive transistor Q1 is a BJT. Note that in other embodiments other power converter topologies may be used for the power converter such as the flyback topology.

Specifically, the bridge rectifier BR1 receives the phase-angle adjusted AC voltage 110 and generates a rectified input voltage 112. The power controller 30 receives the rectified input voltage 112 and controls the base current $I_B$ to the drive transistor Q1 coupled to the power controller 30. Power controller 30 can operate in different modes: a detection mode and an open loop mode. During a detection mode, the power controller 30 detects the common-emitter current gain ($h_{FE}$) of the transistor Q1 by driving the base current $I_B$ to known current levels and measuring the emitter current $I_E$ through the current feedback signal Isen. The voltage level of current feedback signal Isen represents an amount of the emitter current $I_E$ flowing through the sense resistor Rs. In other embodiments, Isen may be configured to represent the collector current $I_C$ instead of the emitter current $I_E$. During an open loop mode of operation, the power controller 30 drives the base current $I_B$ without using any feedback from the current feedback signal Isen. Because the power controller 30 switches between using the feedback signal Isen and not using the feedback signal Isen, the power converter can in some embodiments be viewed as a sampled closed loop.

In one embodiment, the open loop mode of operation can be subdivided into a linear sub-mode and a switching sub-mode. During the linear sub-mode the power controller 30 operates the transistor Q1 in its forward-active region 362 (see FIG. 3B) as a linear current sink that provides a bleeding current for the dimmer 10 via the inductor L1. The bleeding current is used to keep the dimmer functioning properly. The power controller 30 sets the collector current $I_C$ to a target current level that is high enough to keep the dimmer functioning properly, but not so high that the current causes significant power loss. To set the collector current $I_C$ to the target current level, the power controller 30 calculates a base current $I_B$ as a function of the detected gain of the drive transistor Q1. By detecting the gain of the transistor Q1 and then setting the base current based on the sensed gain, potential variations in gain of the transistor Q1 across different transistor parts are compensated for, and the collector current $I_C$ can be set to a predictable target level regardless of the gain of the transistor Q1.

During the switching sub-mode, the power controller 30 controls the on and off times of BJT Q1 to generate a DC output voltage 114 from the rectified input voltage 112. The DC output voltage 114 may have a higher voltage level than the rectified input voltage 112 due to the operation of the boost converter. The power controller 30 controls the on and off times of the BJT Q1 by continuously switching the base current $I_B$ on and off. When the base current $I_B$ is off, it is set to a low current level such that the BJT Q1 operates in its cutoff region. When the base current $I_B$ is on, it is set to a high current level such that the BJT Q1 to operates in its saturation region.

The current regulator 40 receives the DC output voltage 114 from the switching power converter. The current regulator 40 also receives one or more control signals 116 from the power controller 30 and regulates current through the light emitting diode LED1 under the control of the control signals 116. Control signals 116 may include, for example, an indication of the phase-cut in the rectified input signal 112 corresponding to the desired dimming level. Current regulator 40 may employ pulse-width-modulation (PWM) or constant current control to achieve the target light output intensity for the light emitting diode LED1. In one embodiment, current regulator 40 is a collection of components that uses a flyback topology to regulate current through the light emitting diode LED1.

Figure 2:
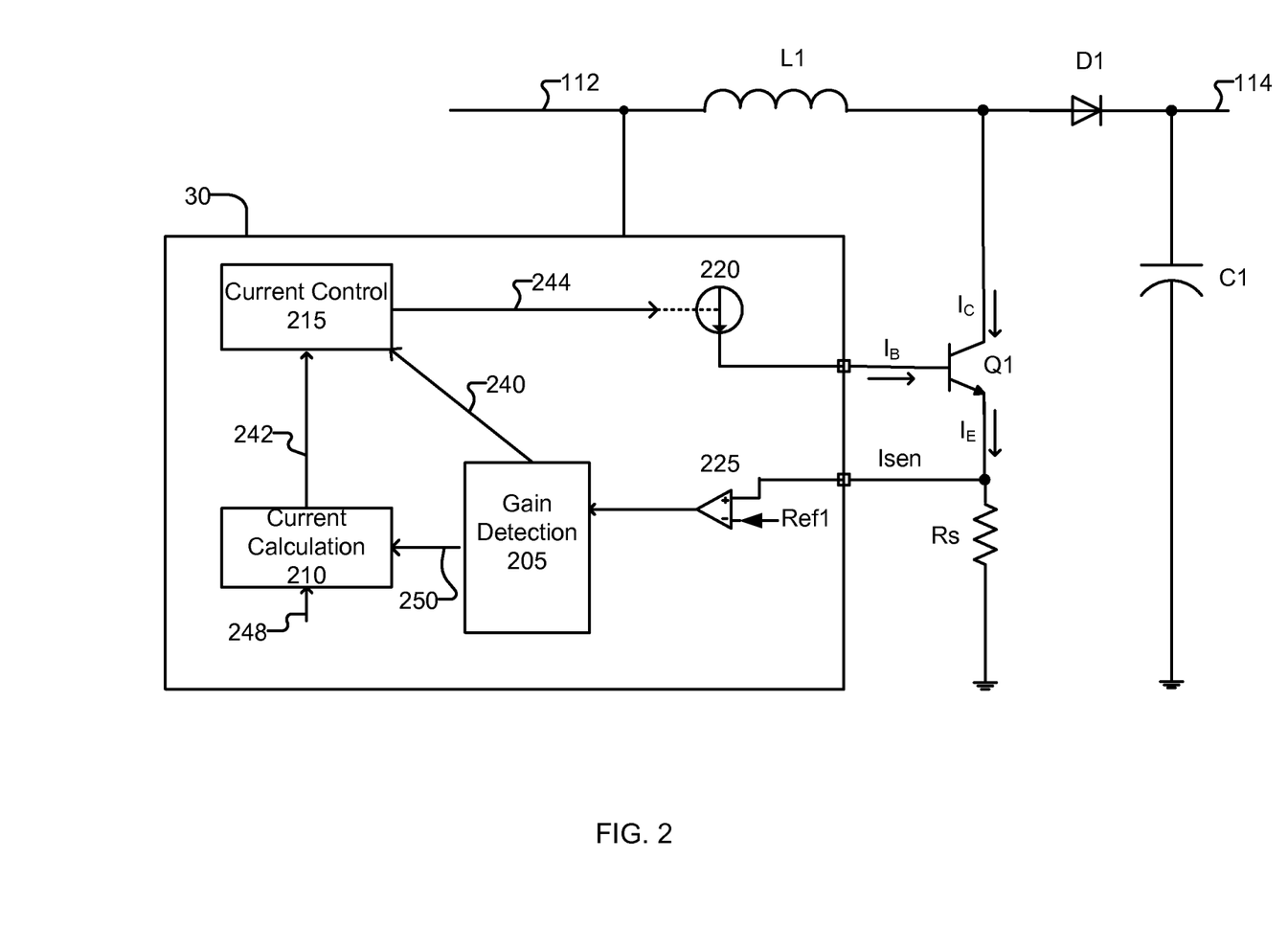
FIG. 2 illustrates a detailed view of a power controller according to one embodiment.

FIG. 2 illustrates one embodiment of a detailed view of the power controller 30, according to one embodiment. In one embodiment, the power controller 30 is an integrated circuit, such as an application specific integrated circuit (ASIC). As shown, the power controller 30 includes a comparator 225, a gain detection block 205, a current calculation block 210, a current control block 215, and a current source 220. In one embodiment, each of the components in the power controller may be implemented with one or more hardware circuits. In other embodiments, there may be additional components or connections that are not shown in the figure for clarity.

Generally speaking, during a detection mode of operation, the gain detection block 205 detects a gain of the drive transistor Q1. During an open loop mode of operation (more specifically, the linear sub-mode), the detected gain is then used by the current calculation block 210 to calculate a current setting for the base current $I_B$ so that the collector current $I_C$ is set to a target current level established by target current signal 248.

The current control block 215 generates a current control signal 244 that controls the amount of base current $I_B$ provided by the current source 220. The current control signal 244 also receives two different current settings signals, 240 and 242, each representing a current level setting for the base current $I_B$. The current setting signals 240 and 242 may be either digital or analog signals. The current control block selects one of the current setting signals 240 or 242 for generating the current control signal 244 depending on whether the controller 30 is operating in the detection mode of operation or open loop mode of operation.

During the detection mode of operation, the current control block 215 uses the current setting signal 240 from the gain detection block 205 to generate the current control signal 244. The current source 220 then generates a base current $I_B$ having a first base current level 310 that matches the current setting indicated by the current setting signal 240. For example, if the current setting signal 240 indicates that the base current $I_B$ is to be set to 10 mA, the current control block 215 generates a current control signal 244 that causes the current source 220 to generate a base current $I_B$ having a level of approximately 10 mA.

On the other hand, during the open loop mode of operation (more specifically, the linear sub-mode), the current control block 215 uses the current setting signal 242 from the current calculation block 242 to generate the current control signal 244. The current source 220 then generates a base current $I_B$ having a second base current level 360 that matches the current setting indicated by the current setting signal 242. For example, if the current setting signal 242 indicates that the base current $I_B$ is to be set to 15 mA, the current control block 215 generates a current control signal 244 that causes the current source 220 to generate a base current $I_B$ having a level of approximately 15 mA.

During the switching sub-mode, the current control block 215 may generate a current control signal 244 that switches $I_B$ on and off regardless of the settings for the current setting signals 240 and 242. When the base current $I_B$ is off, it is set to a low current level such that the BJT Q1 operates in its cutoff region. When the base current is on $I_B$, it is set to a high current level such that the BJT Q1 to operates in its saturation region.

The gain detection block 205 is configured to detect a gain of the transistor Q1 during the detection mode of operation. Specifically, the gain detection block 205 generates the current setting signal 240 that represents an intended current setting for the base current $I_B$. In one embodiment, the gain detection block 205 generates the current setting signal 240 with a digital to analog converter (DAC) that has a limited resolution (i.e. 3 or 4 bits). The current setting signal 240 can thus be set to a limited number of values.

The current control block 215 receives the current setting signal 240 and generates the current control signal 244 that causes the base current $I_B$ to have a current level that matches the current setting indicated by the current setting signal 240. The base current $I_B$ is applied to the drive transistor Q1 to generate an emitter current $I_E$ that flows out of the drive transistor Q1. The level of the emitter current $I_E$ is measured as the voltage drop across the sense resistor Rs and fed back to the power controller 30 through the current feedback signal Isen. Sense resistor Rs may have a low resistance such that the power dissipation across the sense resistor Rs is negligible. In other embodiments, other methods of measuring the emitter current $I_E$ and generating the current feedback signal Isen are possible. In other embodiments, the collector current $I_C$ may be measured and used to generate the current feedback signal Isen instead of the emitter current $I_E$.

The comparator 225 compares the current feedback signal Isen to a reference current signal Ref1. Reference current signal Ref1 represents a known level of current and may be provided by the gain detection block 205 or fixed to some pre-determined level. The output of the comparator 255 is a comparison signal that indicates whether the emitter current $I_E$ level is higher than the current level represented by the reference current signal Ref1. If current feedback signal Isen is lower than the reference current signal Ref1, gain detection block 205 increases the base current $I_B$ setting via current setting signal 240 until the current feedback signal Isen is approximately equal to the reference current signal Ref1. If the current feedback signal Isen is higher than the reference current signal Ref1, gain detection block 205 decreases the base current $I_B$ setting via current setting signal 240 until the current feedback signal Isen is approximately equal to the reference current signal Ref1. In one embodiment, the gain detection 205 may utilize a binary or linear search algorithm that steps through different current settings for the base current $I_B$ until the feedback signal Isen converges on the reference current signal Ref1.

Once the final base current $I_B$ setting is determined, the gain of the drive transistor Q1 is calculated with the following equation:

$$h_{FE} = (Iref1/I_B) - 1 \qquad \text{(equation 1)}$$

Where $h_{FE}$ is the detected gain of the drive transistor Q1. Iref1 is the current level represented by the reference current signal Ref1. $I_B$ is the base current level. The base current $I_B$ level can be determined directly from the base current $I_B$ setting, or it can be measured with a separate circuit.

The current calculation block 210 is responsible for determining a current setting for the base current $I_B$ so that the collector current $I_C$ is set to a target current level during the open loop mode of operation (more specifically, the linear sub-mode). Specifically, the current calculation block 210 receives a gain signal 250 generated by the gain detection block 205 that represents the detected gain of the drive transistor Q1. The current calculation block 210 also receives a target current signal 248 that represents a target current level (i.e. an intended current level) of the collector current $I_C$. The current calculation block 210 then calculates a current level setting for the base current $I_B$ as a function of the gain of the drive transistor Q1 and the target current level. For example, the base current $I_B$ can be calculated with the following formula:

$$I_B = Itgt/h_{FE} \qquad \text{(equation 2)}$$

Where $I_B$ is the base current level. Itgt is the target current level of the collector current Ic, as indicated by target current signal 248. $h_{FE}$ is the detected gain of the drive transistor Q1.

The current calculation block 210 generates a current setting signal 242 that is indicative of the calculated current setting for the base current $I_B$. The current control block 215 receives the current setting signal 242 and generates a current control signal 244 that causes the current source 220 to generate a base current $I_B$ having a current level that matches the calculated current setting. As a result, the level of the collector current $I_C$ is set to the target current level indicated by the target current signal 248.

In one embodiment, the target current level is generated by a target current determination block (not shown) within the power controller 30. The target current level can be set to a level that is high enough to ensure that the dimmer switch 10 is operating properly, but not so high that it results in a large amount of power loss. In one embodiment, the target current level is set to known latch and hold current requirements of the dimmer 10. The target current level may also be influenced by the level of the rectified input voltage 112. The rectified input voltage 112 is generally a periodic waveform that has varying voltage levels. If the input voltage 112 is higher, the target current level can be decreased. If the input voltage 112 is lower, the target current level can be increased.

Figure 3A:
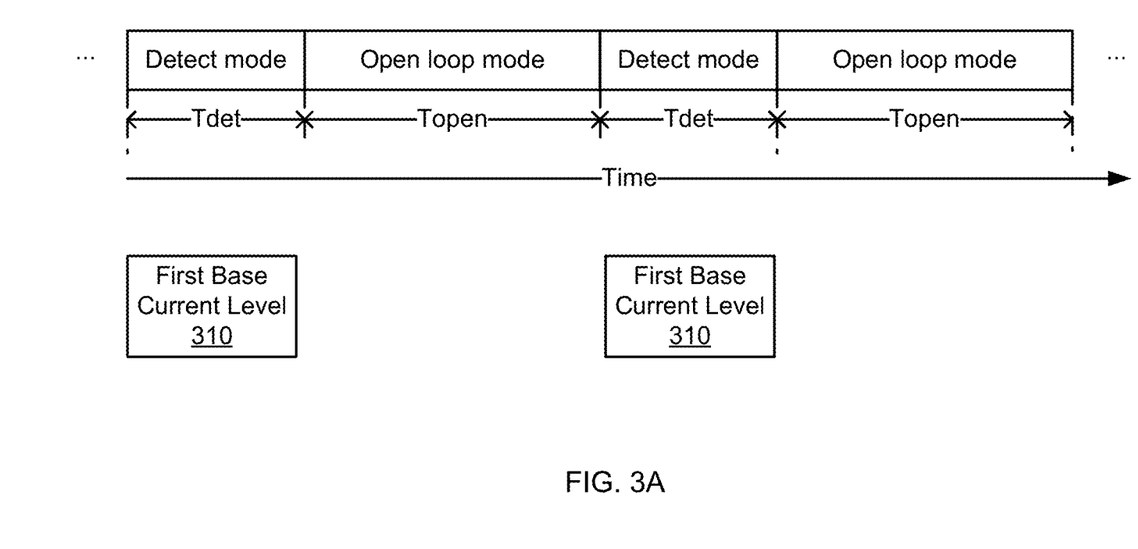
FIG. 3A illustrates detection modes and open loop modes of the power controller 30, according to one embodiment.

FIG. 3A illustrates detection modes and open loop modes of the power controller 30, according to one embodiment. As shown, the power controller 30 continuously cycles between open loop and detection modes of operation. Each open loop mode being distinct in time and following (either immediately or not immediately) a detection mode. The open loop modes and detect modes are also sequentially repeating. As the gain of a drive transistor Q1 may change over time due to changes in environmental factors such as temperature, periodically checking the gain helps to maintain an accurate measurement of the gain. The modes of operation may be set to any lengths of time. If no changes in environmental factors are expected, the gain of the drive transistor Q1 is not likely to change and thus the detection mode can be performed less frequently (i.e. once every second). On the other hand, if changes in environmental factors are expected, the detection mode can be performed more frequently (i.e. once every millisecond). In one embodiment, the length of the detection mode Tdet is only 0.1 milliseconds.

In other embodiments, detection mode may be entered only once when the power controller 30 is first powered on. After detection mode is completed one time, the power controller 30 operates in open loop mode until power is removed from the power controller 30.

Figure 3B:
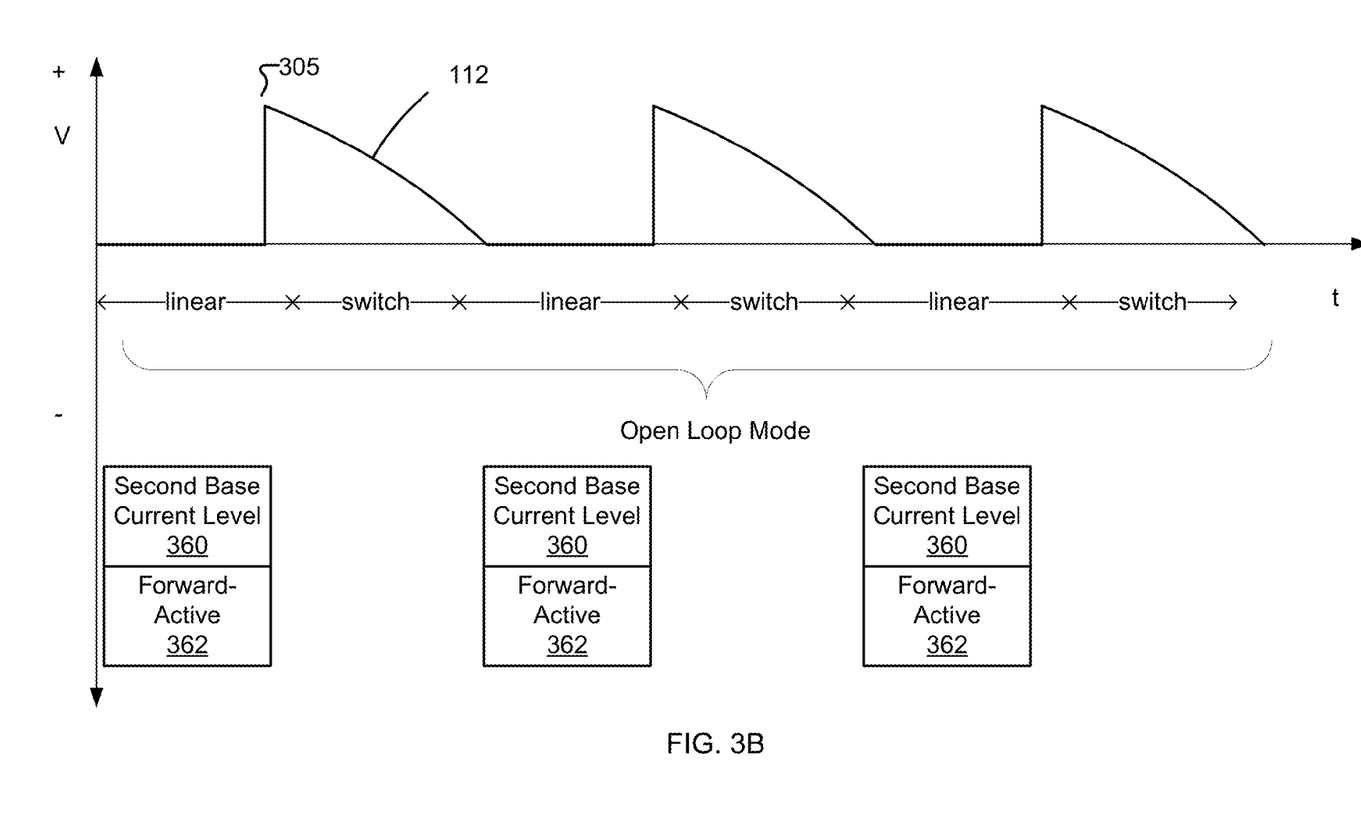
FIG. 3B illustrates a waveform of the rectified input signal during open loop mode, according to one embodiment.

FIG. 3B illustrates a waveform of the rectified input signal 112 during open loop mode, according to one embodiment. The rectified input signal 112 has a phase cut 305 that is caused by the dimming of the dimmer switch 10. As shown, the open loop mode of operation can be sub-divided into two sub-modes: linear mode and switching mode. The sub-modes are distinct in time from each other. During the linear mode, the power controller 30 operates the drive transistor Q1 in its active region by precisely controlling the base current $I_B$ to the drive transistor Q1, thereby controlling the level of the collector current $I_C$. During the switching mode, the power controller 30 operates the drive transistor Q1 in its saturation region by switching the drive transistor Q1 on and off. In one embodiment, the target current level and detected gain of the transistor are used to calculate and set the base current $I_B$ level during linear mode but not during switching mode.

The linear modes and switching modes do not line up exactly with the phase cut 305. Instead, the linear mode extends past the phase cut 305 for a small amount of time until the power controller 30 switches to the switching mode. Due the sudden change in the rectified input voltage 112 caused by the phase cut 305, controlling the collector current $I_C$ in response to the phase cut would be difficult if the power controller 30 operated with closed loop feedback (closed loop systems are slower). However, because the power controller 30 operates as an open loop, it can quickly set the collector current $I_C$ to the target current level by directly adjusting the base current $I_B$ to account for any sudden changes in the rectified input voltage 112, such as the phase cut 305.

In one embodiment, the rectified input signal 112 may also represent the appearance of the rectified input signal 112 during the detection mode. The rectified input signal 112 thus appears the same, regardless of whether the power converter is operating in detection mode or open loop mode.

Figure 4:
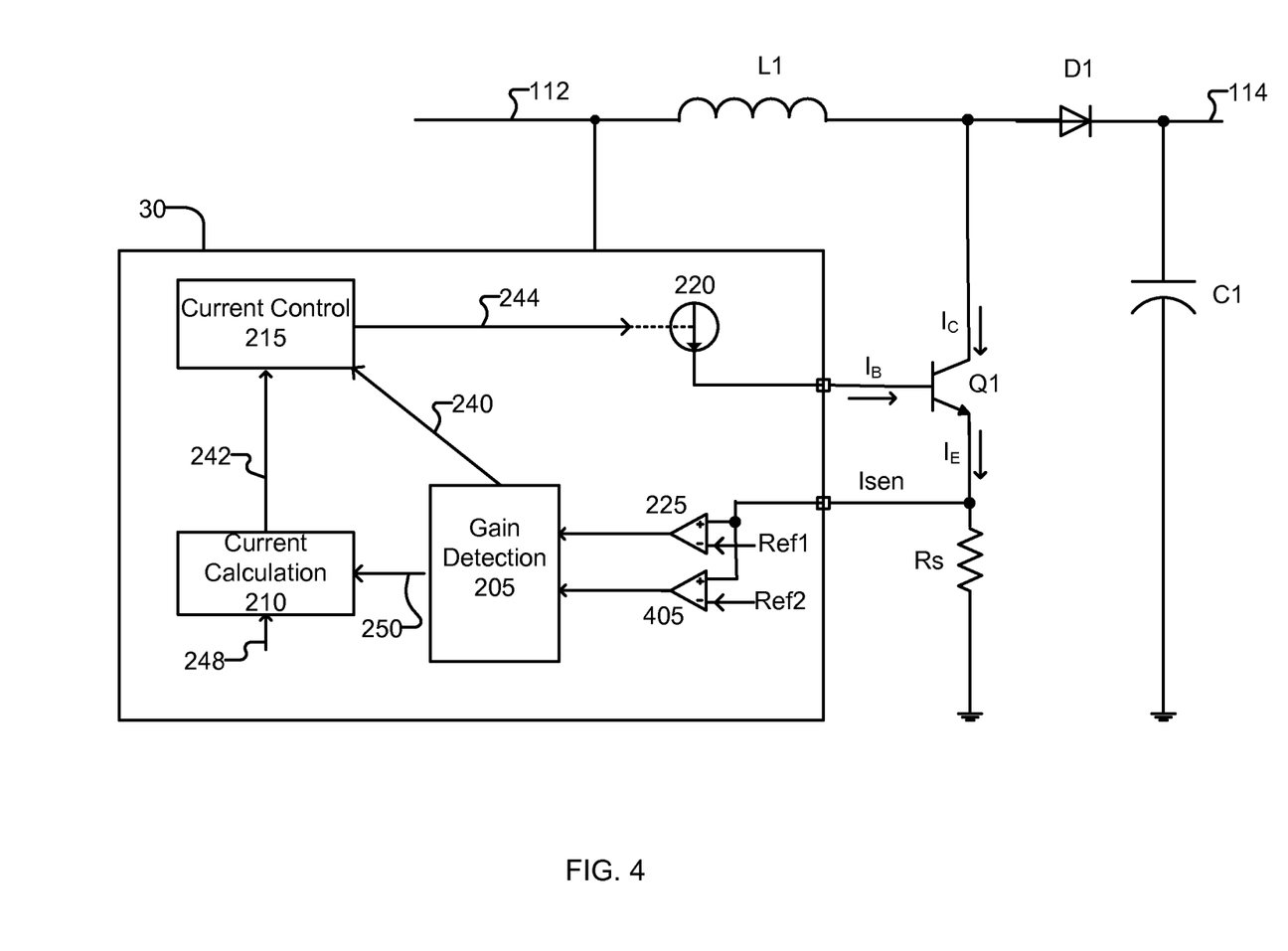
FIG. 4 illustrates a detailed view of a power controller according to another embodiment.

FIG. 4 illustrates a detailed view of the power controller 30, according to another embodiment. The embodiment in FIG. 4 is similar to the embodiment in FIG. 2, but now includes a second comparator 405. During the detection mode of operation, comparator 225 compares the current feedback signal Isen to the current reference signal Ref1. The output of the comparator 255 is a comparison signal that indicates whether the emitter current $I_E$ level is higher than the current level represented by the reference current signal Ref1. Comparator 405 compares the current feedback signal Isen to a different current reference signal Ref2. The output of the comparator 405 is a comparison signal that indicates whether the emitter current $I_E$ level is higher than the current level represented by the reference current signal Ref2.

The current level represented by current reference signal Ref1 is higher than the current level represented by current reference signal Ref2, in effect creating a current "window" between the two current reference signals Ref1 and Ref2. When the feedback signal Isen is within the current window between Ref2 and Ref1, the output of comparator 225 and the output of comparator 405 have opposite values. In one embodiment, gain detection block 205 attempts to set the base current $I_B$ level such that the current feedback signal Isen falls within the current window. The gain detection block may step through different base current $I_B$ levels using any type of search algorithm, such as a binary or linear search algorithm.

Once the final base current $I_B$ setting is determined, the gain of the drive transistor Q1 is calculated with the following equation:

$$\left(\frac{Iref1}{I_B} - 1\right) < h_{FE} < \left(\frac{Iref2}{I_B} - 1\right) \quad \text{(equation 3)}$$

Where $h_{FE}$ is the detected gain of the drive transistor Q1. Iref1 is the current level represented by the reference current signal Ref1. Iref2 is the current level represented by the reference current signal Ref2. $I_B$ is the base current level that resulted in the feedback signal Isen being within the current window between Ref2 and Ref1.

The size of the current window is determined by the values of current reference signals Ref1 and Ref2. In one embodiment, the current window is large enough so that, for a given range of possible transistor gains, at least one base current $I_B$ setting generated by the gain detection block 205 will result in the feedback signal Isen falling inside the current window. The relationship between the current levels represented by Ref1 and Ref2 is can be determined with the following equation:

$$dI_B \times h_{FE-MAX} < Iref1 - Iref2 \quad \text{(equation 4)}$$

Where $dI_B$ is the amount of change in the setting for the base current $I_B$ level from one current step to the next current step. $h_{FE-MAX}$ is the maximum transistor gain that the power converter 30 supports. Iref1 is the current level represented by the reference current signal Ref1. Iref2 is the current level represented by the reference current signal Ref2.

The embodiment in FIG. 4 can detect the gain of the drive transistor Q1 faster than the embodiment shown in FIG. 2. However, the embodiment in FIG. 4 may be less accurate in detecting the gain of the drive transistor Q1 than the embodiment shown in FIG. 2. The open loop operation of the power controller 30 in FIG. 4 is substantially similar to that shown in FIG. 2.

Figure 5:
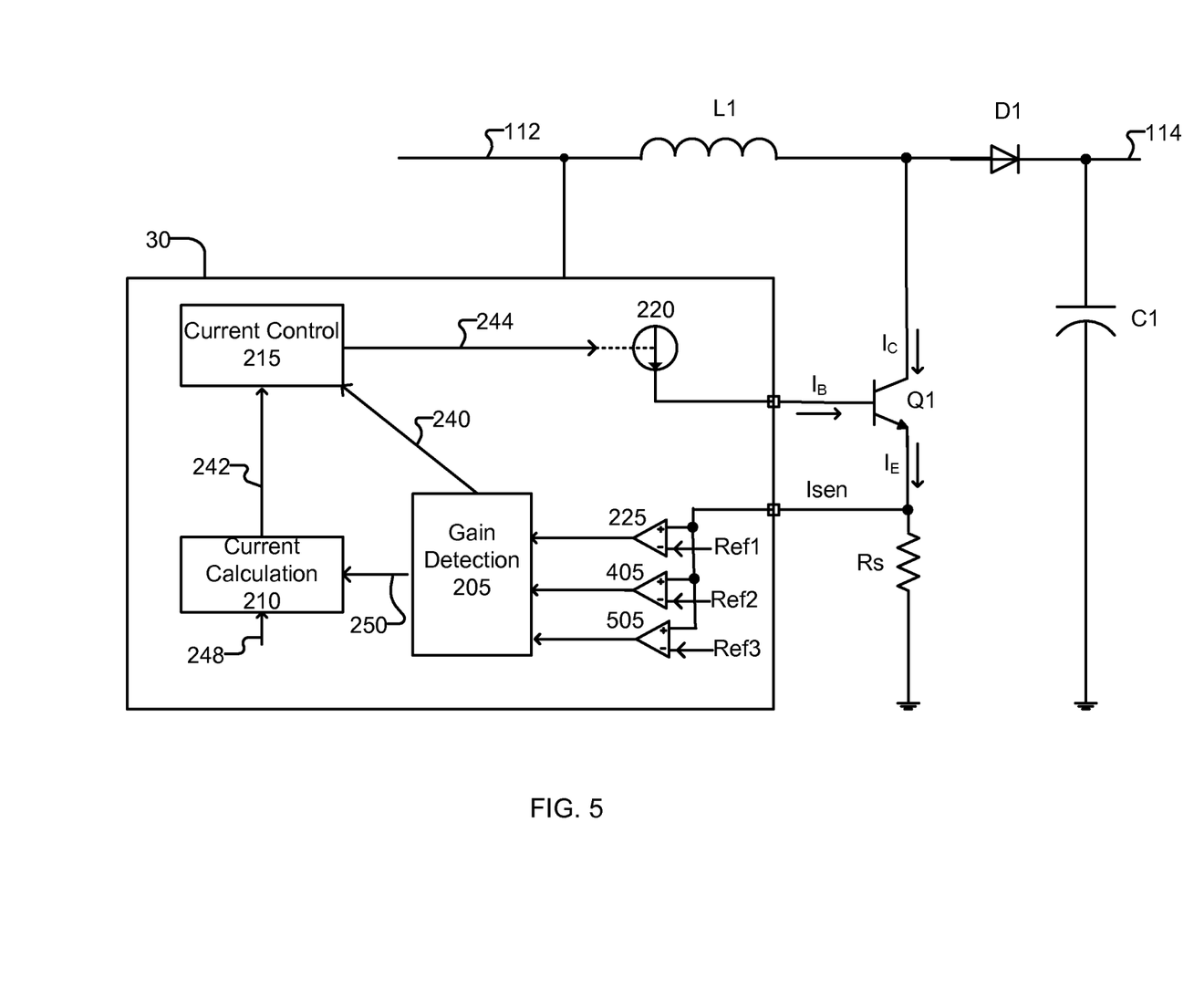
FIG. 5 illustrates a detailed view of a power controller according to yet another embodiment.

FIG. 5 illustrates one embodiment of a detailed view of the power controller 30, according to yet another embodiment. The embodiment in FIG. 5 is similar to the embodiment in FIG. 2, but now includes a third comparator 505 that provides a layer of fault protection. During the detection mode of operation, comparator 505 compares the current feedback signal Isen to a current reference signal Ref3. The output of the comparator 505 is a comparison signal that indicates whether the emitter current $I_E$ level is higher than the current level represented by the reference current signal Ref3.

Comparator 505 provides a layer of fault protection to avoid mis-detections when detecting the gain of the drive transistor Q1. Specifically, the current level represented by Ref3 is lower than the current levels represented by Ref1 or Ref2. Thus, Ref3 is set to a much lower voltage level than either Ref1 or Ref2. However, Ref3 is set high enough so that the comparator 505 does not accidentally trigger on ground noise.

The output of the comparator 505 indicates whether a fault condition exists in the power converter circuitry. If the output of the comparator 505 is not triggered (i.e. it is logic low), it indicates that emitter current $I_E$ is very low and so there is probably a condition outside of the power controller 30 that is preventing the transistor Q1 from operating in its forward-active region. The fault condition may be the rectified input voltage 112 having an extremely low voltage level. For example, referring to FIG. 3B, the rectified input voltage 112 sometimes has a zero voltage level prior to the phase cut 305. Gain of the drive transistor Q1 cannot be measured during these periods of time when the rectified input voltage 112 is low. Other examples of fault conditions includes components, such as the BJT Q1, not being present. On the other hand, if the output of comparator 505 is triggered (i.e. it is logic high), it indicates that a fault condition does not exist and that the gain of the transistor Q1 can be measured.

In one embodiment, when the output of the comparator 505 is not triggered, indicating a fault condition, the gain detection block 205 may disregard any gain detected by the gain detection block 205. Alternatively, the gain detection block 205 may wait until the emitter current $I_E$ reaches the threshold current level indicated by the reference current signal Ref3 before attempting to step through different settings for the base current $I_B$.

Although the embodiments described herein describes measuring the emitter current $I_E$ and using the emitter current $I_E$ to determine a gain of the BJT Q1, in other embodiments the power controller 30 may measure the collector current $I_C$ and use the collector current $I_C$ to determine a gain of the BJT Q1.

Upon reading this disclosure, those of skill in the art will appreciate still additional alternative designs for adaptive bipolar junction transistor gain detection in a switching power converter. Thus, while particular embodiments and applications have been illustrated and described, it is to be understood that the embodiments discussed herein are not limited to the precise construction and components disclosed herein and that various modifications, changes and variations which will be apparent to those skilled in the art may be made in the arrangement, operation and details of the method and apparatus disclosed herein without departing from the spirit and scope of the disclosure.

What is claimed is:

1. A power converter comprising:
   a magnetic component coupled to an input voltage and to an output of the power converter, a shape of the input voltage having a phase cutoff portion adjustable by a dimmer switch;
   a bipolar junction transistor (BJT) coupled to the magnetic component;
   a current control circuit configured to generate a control signal for controlling a base current of the BJT;
   a gain detection circuit configured to, during a first mode, generate a first current setting signal for setting the base current of the BJT to a first base current level and to determine a current gain of the BJT in a forward-active region based on a feedback signal indicative of a level of current flowing through the BJT and the first base current level, the control signal generated responsive to the first current setting signal in the first mode; and
   a current calculation circuit configured to, during a second mode distinct in time from the first mode, generate a second current setting signal for setting the base current of the BJT to a second base current level that operates the BJT in the forward-active region during the phase cutoff portion of the shape of the input voltage, the current calculation circuit determining the second base current level responsive to a target current level and the determined current gain of the BJT, the BJT drawing current from the dimmer switch when operated in the forward-active region during the second mode, the control signal generated responsive to the second current setting signal in the second mode,
   the current control circuit generating the control signal to switch the BJT between a saturation region and a cutoff region during a third mode distinct in time from the first mode and the second mode, the third mode substantially corresponding to a portion of the input voltage that is not cutoff by the dimmer switch.

2. The power converter of claim 1, further comprising:
   a first comparator configured to compare the feedback signal indicative of a level of the current flowing through the BJT to a first reference signal indicative of a first reference current level; and
   wherein the gain detection circuit determines the current gain of the BJT based on an output of the first comparator.

3. The power converter of claim 1, wherein the level of the current flowing through the BJT is one of: a level of an emitter current of the BJT or a level of a collector current of the BJT.

4. The power converter of claim 1, wherein the first mode and the second mode are sequentially repeating modes.

5. The power converter of claim 1, wherein current through a light emitting diode is regulated based on an output voltage at the output of the power converter.

6. The power converter of claim 1, wherein the gain detection circuit uses a division operation to determine the current gain of the BJT in the forward-active region based on the feedback signal indicative of the level of current flowing through the BJT and the first base current level.

7. The power converter of claim 2, wherein the gain detection circuit determines the current gain of the BJT as a function of the first reference current level and the first base current level.

8. The power converter of claim 2, further comprising:
   a second comparator configured to compare the feedback signal indicative of the current flowing through the BJT to a second reference signal indicative of a second reference current level,
   wherein the gain detection circuit determines the current gain of the BJT based on an output of the second comparator.

9. The power converter of claim 8, wherein the first reference current level is higher than the second reference current level.

10. The power converter of claim 8, further comprising:
    a third comparator configured to compare the feedback signal indicative of the current flowing through the BJT to a third reference signal indicative of a third reference current level,
    wherein an output of the third comparator is indicative of a fault condition of the power converter responsive to the feedback signal being lower than the third reference signal.

11. The power converter of claim 9, wherein the gain detection circuit determines the current gain of the BJT as a function of the first reference current level, the second reference current level, and the first base current level.

12. The power converter of claim 10, wherein the third reference current level is lower than the first and second reference current levels.

13. A method of operation in a power converter comprising a magnetic component coupled to an input voltage and an output of the power converter, a shape of the input voltage having a phase cutoff portion adjustable by a dimmer switch, the method comprising:

generating a control signal for controlling a base current of a bipolar junction transistor (BJT) coupled to the magnetic component, the control signal generated, during a first mode, responsive to a first current setting signal to set the base current of the BJT to a first base current level;

determining, during the first mode, a current gain of the BJT in a forward-active region responsive to a feedback signal indicative of a level of current flowing through the BJT and the first base current level;

determining, during a second mode that is distinct in time from the first mode, a second base current level responsive to a target current level of the current flowing through the BJT and the determined current gain of the BJT;

generating, during the second mode, the control signal responsive to a second current setting signal to set the base current of the BJT to the second base current level to operate the BJT in the forward-active region during the phase cutoff portion of the shape of the input voltage, the BJT drawing current from the dimmer switch when operated in the forward-active region during the second mode; and generating, during a third mode distinct in time from the first mode and the second mode, the control signal to switch the BJT between a saturation region and a cutoff region, the third mode substantially corresponding to a portion of the input voltage that is not cutoff by the dimmer switch.

14. The method of claim 13, further comprising:
comparing the feedback signal indicative of the level of the current flowing through the BJT to a first reference signal indicative of a first reference current level, and wherein determining the current gain of the BJT comprises determining the current gain of the BJT based on the comparing the feedback signal to the first reference signal.

15. The method of claim 13, wherein the level of the current flowing through the BJT is one of: a level of an emitter current of the BJT or a level of a collector current of the BJT.

16. The method of claim 13, wherein the first mode and the second mode are sequentially repeating modes.

17. The method of claim 14, wherein determining the current gain of the BJT comprises determining the current gain of the BJT as a function of the first reference current level and the first base current level.

18. The method of claim 14, further comprising:
comparing the feedback signal indicative of the level of the current flowing through the BJT to a second reference signal indicative of a second reference current level, and wherein determining the current gain of the BJT comprises determining a current gain of the BJT based on the comparing the feedback signal to the second reference signal.

19. The method of claim 18, wherein the first reference current level is higher than the second reference current level.

20. The method of claim 18, further comprising:
comparing the feedback signal indicative of the level of the current flowing through the BJT to a third reference signal indicative of a third reference current level, and wherein an output of comparing the feedback signal to the third reference signal is indicative of a fault condition of the power converter responsive to the feedback signal being lower than the third reference signal.

21. The method of claim 19, wherein the determining the current gain of the BJT comprises determining the current gain of the BJT as a function of the first reference current level, the second reference current level, and the first base current level.

22. The method of claim 20, wherein the third reference current level is lower than the first and second reference current levels.

* * * * *